US012693874B2

(12) United States Patent
Baliga et al.

(10) Patent No.: US 12,693,874 B2
(45) Date of Patent: Jul. 28, 2026

(54) HARDWARE-DRIVEN CALL STACK ATTRIBUTION

(71) Applicant: NVIDIA Corporation, Santa Clara, CA (US)

(72) Inventors: Avinash Bantval Baliga, Cedar Park, TX (US); Gregory Paul Smith, Cedar Park, TX (US); Magnus Strengert, Cedar Park, TX (US)

(73) Assignee: NVIDIA Corporation, Santa Clara, CA (US)

( * ) Notice: Subject to any disclaimer, the term of this patent is extended or adjusted under 35 U.S.C. 154(b) by 304 days.

(21) Appl. No.: 18/122,832

(22) Filed: Mar. 17, 2023

(65) Prior Publication Data

US 2024/0311163 A1 Sep. 19, 2024

(51) Int. Cl.
| | |
|---|---|
| *G06F 9/448* | (2018.01) |
| *G06F 9/30* | (2018.01) |
| *G06F 9/38* | (2018.01) |
| *G06F 11/34* | (2006.01) |

(52) U.S. Cl.
CPC ........ *G06F 9/4484* (2018.02); *G06F 9/30101* (2013.01); *G06F 9/3851* (2013.01); *G06F 11/3466* (2013.01)

(58) Field of Classification Search
CPC .. G06F 9/30101; G06F 9/3804; G06F 9/3851; G06F 9/4484; G06F 11/3466; G06F 2201/865
See application file for complete search history.

(56) References Cited

U.S. PATENT DOCUMENTS

| | | | | |
|---|---|---|---|---|
| 6,349,406 B1 * | 2/2002 | Levine | ............... | G06F 11/3466 |
| | | | | 702/179 |
| 2006/0130001 A1 * | 6/2006 | Beuch | ................ | G06F 11/3466 |
| | | | | 717/130 |
| 2020/0285606 A1 * | 9/2020 | Grant | ................... | G06F 11/302 |
| 2021/0109844 A1 * | 4/2021 | Allyn | ................. | G06F 11/3037 |

OTHER PUBLICATIONS

IP.com, "Fast Identification Of Previously Retrieved Callstacks", Nov. 1, 2010, pp. 1-2.*
Reddy, "Conditional call instructions in 8085 Microprocessor", Apr. 11, 2021, 1 page, Retrieved from the Internet on May 30, 2024, <URL: https://web.archive.org/web/20210411102141/https://www.tutorialspoint.com/conditional-call-instructions-in-8085-microprocessor >.*

(Continued)

*Primary Examiner* — David J. Huisman
(74) *Attorney, Agent, or Firm* — Lowenstein Sandler LLP

(57) ABSTRACT

Apparatuses, systems, and techniques for hardware-driven call stack attribution. The apparatuses, systems, and techniques include generating and updating call stacks within a processing device during execution of an application. In particular, a branch identifier associated with an instruction being executed by an execution thread is determined. A call stack identifier of the execution thread executing the instruction is identified. The call stack identifier of the execution thread is updated based on the identified call stack identifier of the execution thread and the branch identifier.

21 Claims, 9 Drawing Sheets

(56)    References Cited

OTHER PUBLICATIONS

Arm Limited, Arm® CoreSight Base System Architecture 1.0, Arm Platform Design Document, Jul. 23, 2018, 29 pages. https://developer.arm.com/documentation/den0068/v/?lang=en.

Bakhvalov, "Advanced profiling topics. PEBS and LBR," Easyperf, accessed Feb. 3, 2023, 9 pages. https://easyperf.net/blog/2018/06/08/Advanced-profiling-topics-PEBS-and-LBR.

Cloutier, "WRMSR—Write to Model Specific Register", Apr. 2022, 3 pages. https://www.felixcloutier.com/x86/wrmsr.

Dawson, "Summarizing Xperf CPU Usage with Flame Graphs," Random ASCII—tech blog of Bruce Dawson, posted Mar. 26, 2013, 16 pages. https://randomascii.wordpress.com/2013/03/26/summarizing-xperf-cpu-usage-with-flame-graphs/.

Gregg, "Flame Graphs," Last updated Oct. 31, 2020, accessed Mar. 6, 2023, 15 pages. https://www.brendangregg.com/flamegraphs.html.

Lin and Grover, "Using CUDA Warp-Level Primitives," NVIDIA Technical Blog, Jan. 15, 2018, 6 pages. https://developer.nvidia.com/blog/using-cuda-warp-level-primitives/.

Zhou, et al., "Measurement and Analysis of GPU-accelerated Applications with HPCToolkit," Preprint submitted to Parallel Computing, Aug. 4, 2021, pp. 1-10 and 12-15. https://www.sciencedirect.com/science/article/pii/S0167819121000843.

Intel® 64 and IA-32 Architectures Software Developer's Manual vol. 3B: System Programming Guide, Part 2, Chapter 15 Machine-Check Architecture; Sep. 2016, 582 pages. chrome-extension://efaidnbmnnnibpcajpcglclefindmkaj/https://www.intel.com/content/dam/www/public/us/en/documents/manuals/64-ia-32-architectures-software-developer-vol-3b-part-2-manual.pdf.

Intel® VTune™ Profiler User Guide, accessed Feb. 3, 2023, 881 pages. https://www.intel.com/content/www/us/en/develop/documentation/vtune-help/top/reference/user-interface-reference/window-top-down-tree.html#/window-top-down-tree.

CUDA@ cuda-binary-utilities, Release 12.1, NVIDIA, Feb. 28, 2023, 66 pages. https://docs.nvidia.com/cuda/cuda-binary-utilities/index.html#/instruction-set-ref.

CUDA® CUDA C++ Programming Guide, Release 12.1, NVIDIA, Feb. 28, 2023, 500 pages. https://docs.nvidia.com/cuda/cuda-c-programming-guide/index.html#/simt-architecture.

* cited by examiner

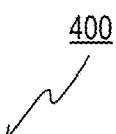

400

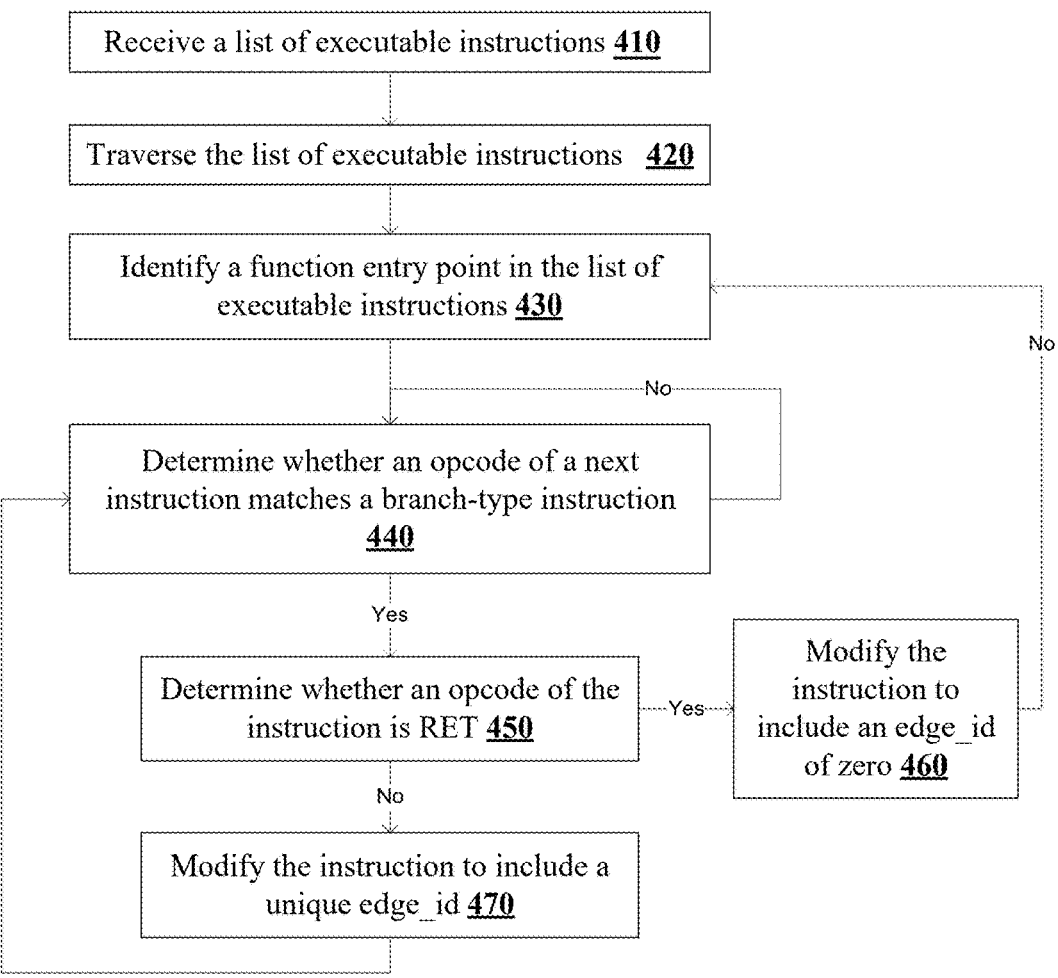

Receive a list of executable instructions 410

Traverse the list of executable instructions   420

Identify a function entry point in the list of executable instructions 430

Determine whether an opcode of a next instruction matches a branch-type instruction 440

No

Yes

Determine whether an opcode of the instruction is RET 450

Yes

Modify the instruction to include an edge_id of zero 460

No

No

Modify the instruction to include a unique edge_id 470

FIG. 4

Instruction Modification Component 500

List of executable instructions 510

| Item | Opcode | Predicate | branch Target | update_ callstack | branch identifier |
|------|--------|-----------|---------------|-------------------|-------------------|
| 520A | ... | ... | ... | 0 | 0xFF |
| 520B | ... | ... | ... | 0 | 0xFF |
| 520C | CALL | ... | ... | 0 | 0xFF |
| 520D | ... | ... | ... | 0 | 0xFF |
| 520E | RET | ... | ... | 0 | 0xFF |
| 520F | ... | ... | ... | 0 | 0xFF |
| 520G | ... | ... | ... | 0 | 0xFF |
| 520H | ... | ... | ... | 0 | 0xFF |
| 520I | ... | ... | ... | 0 | 0xFF |
| 520J | ... | ... | ... | 0 | 0xFF |
| 520K | ... | ... | ... | 0 | 0xFF |
| 520L | ... | ... | ... | 0 | 0xFF |
| 520M | ... | ... | ... | 0 | 0xFF |

List of executable instructions 560

| Item | Opcode | Predicate | branch Target | update_ callstack | branch identifier |
|------|--------|-----------|---------------|-------------------|-------------------|
| 570A | ... | ... | ... | 0 | 0xFF |
| 570B | ... | ... | ... | 0 | 0xFF |
| 570C | CALL | ... | ... | 1 | 0x01 |
| 570D | ... | ... | ... | 0 | 0xFF |
| 570E | RET | ... | ... | 1 | 0x00 |
| 570F | ... | ... | ... | 0 | 0xFF |
| 570G | ... | ... | ... | 0 | 0xFF |
| 570H | ... | ... | ... | 0 | 0xFF |
| 570I | ... | ... | ... | 0 | 0xFF |
| 570J | ... | ... | ... | 0 | 0xFF |
| 570K | ... | ... | ... | 0 | 0xFF |
| 570L | ... | ... | ... | 0 | 0xFF |
| 570M | ... | ... | ... | 0 | 0xFF |

FIG. 5

600
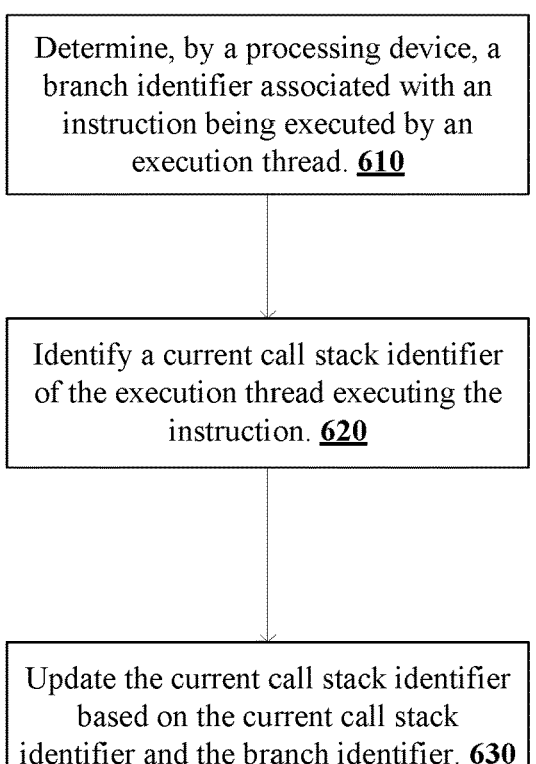
Determine, by a processing device, a branch identifier associated with an instruction being executed by an execution thread. 610
Identify a current call stack identifier of the execution thread executing the instruction. 620
Update the current call stack identifier based on the current call stack identifier and the branch identifier. 630
FIG. 6

700

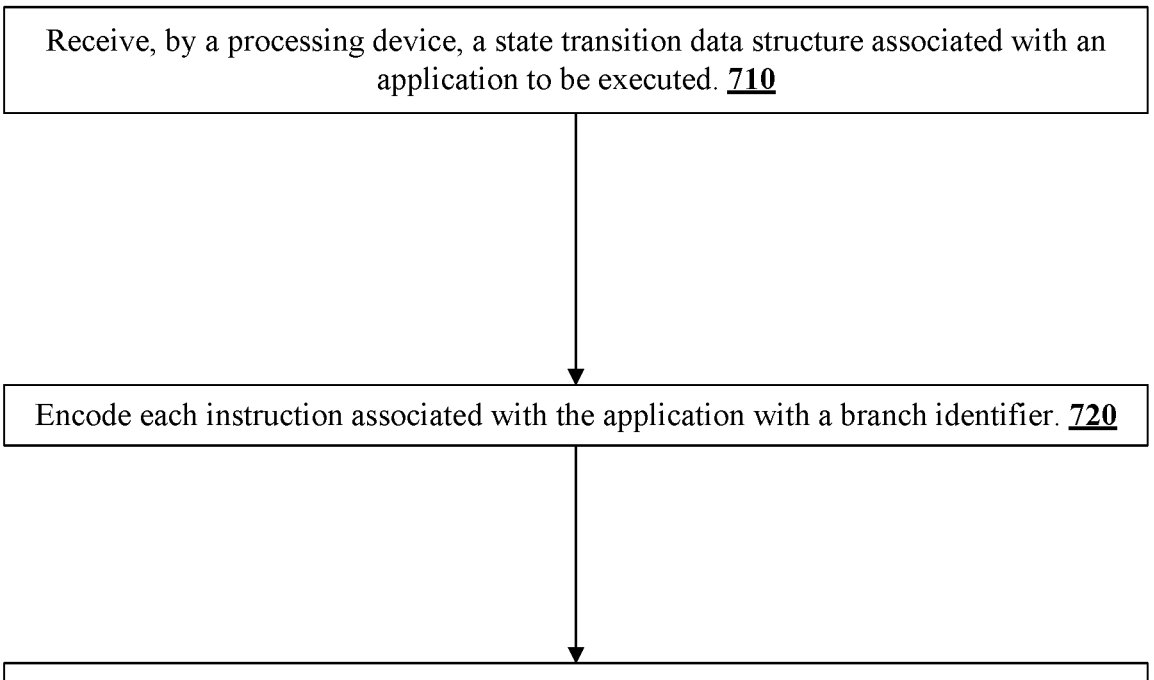

Receive, by a processing device, a state transition data structure associated with an application to be executed. 710

Encode each instruction associated with the application with a branch identifier. 720

Responsive to execution of an instruction on an execution thread, obtain, from the state transition data structure, a next call stack identifier based on a current call stack identifier of the execution thread and the branch identifier of the instruction. 730

FIG. 7

HARDWARE-DRIVEN CALL STACK ATTRIBUTION

TECHNICAL FIELD

According to various novel techniques described herein, at least one embodiment pertains to generating and updating call stacks within a processing device during execution of an application. For example, call stacks are generated and updated for each thread and/or warp. The call stacks can be used for profiling according to various novel techniques described herein.

BACKGROUND

With the increased complexity of applications (and/or softwares), software engineers use various tools and techniques to measure application performance on a processor. Performance tools and/or analysis techniques measure, for example, time complexity of the application, usage of particular instructions, or the frequency and duration of function calls.

BRIEF DESCRIPTION OF DRAWINGS

FIG. 4 is a flow diagram of modifying instructions of a list of executable instructions for hardware-driven call stack attribution, in accordance with at least one embodiment;

FIG. 5 illustrates modification of a list of executable instructions for hardware-driven call stack attribution, in accordance with at least one embodiment;

FIG. 6 is a flow diagram of updating a call stack, in accordance with at least one embodiment;

FIG. 7 is a flow diagram of generating call stacks within a processing device during execution of an application, in accordance with at least one embodiment;

DETAILED DESCRIPTION

Figure 1:
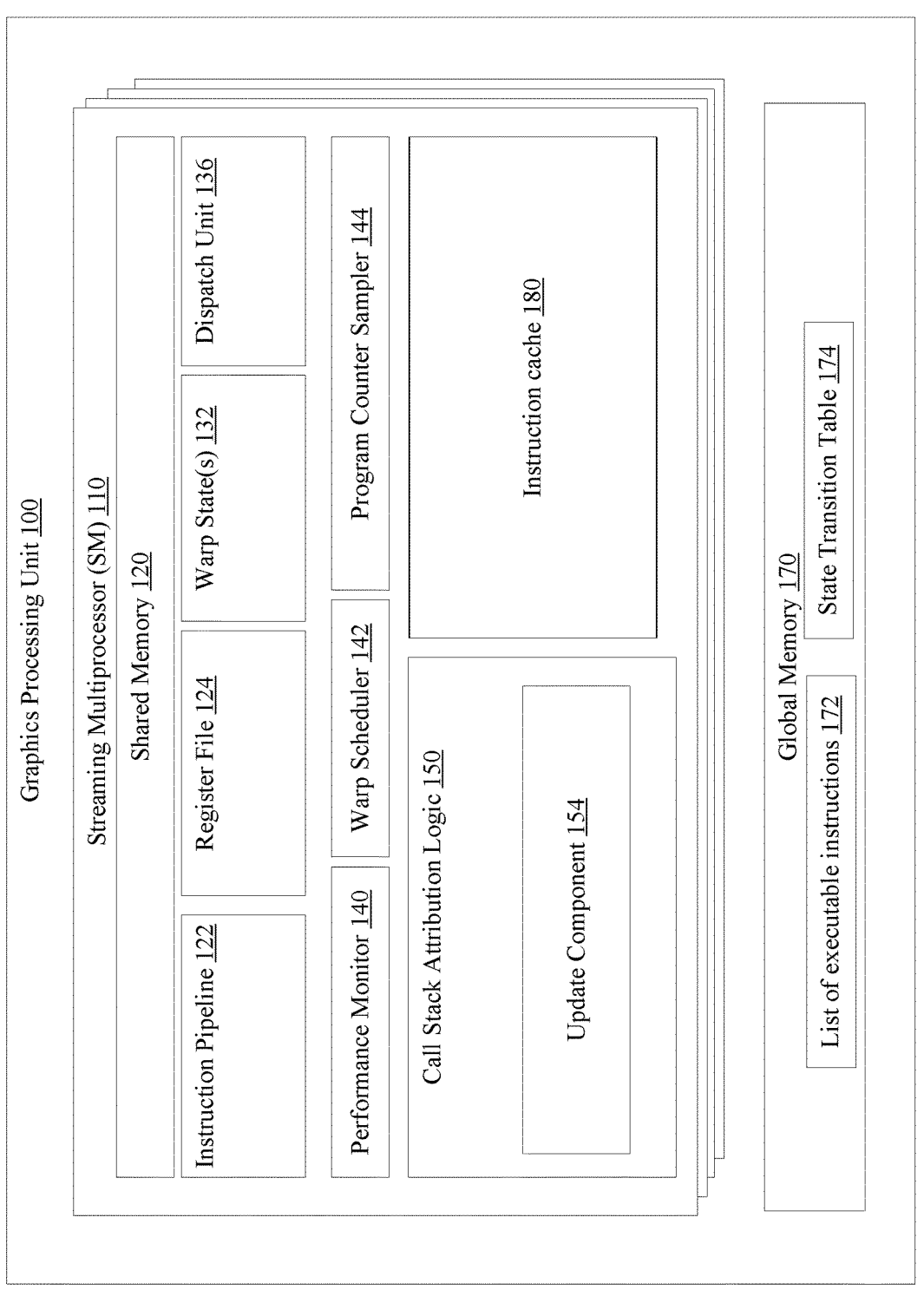
FIG. 1 is a block diagram of a graphics processing unit, in accordance with at least one embodiment.

Various processors, for example, including central processing unit (CPU), graphics processing unit (GPU), application-specific integrated circuit (ASIC), and/or other general purpose or specialized processing devices do not implement hardware-based techniques to measure application (or software) performance on the processor (e.g., GPU). Applications, such as profilers are currently used to measure application performance on the processor. Profilers may use a technique known as instrumentation to add instructions to the code of the application to collect the required information necessary to measure application performance. However, instrumentation may cause performance changes and in some instances provide inaccurate results.

Hardware-based techniques of some central processing units (CPUs), such as, Last Branch Record (LBR) and/or Branch Trace Store (BTS) measure application performance. LBR stores in a collection of register pairs (e.g., model-specific registers (MSRs)) a source and a destination address related to recently executed branch instructions. BTS stores successful branch instructions in a cache-as-RAM or system DRAM. These approaches, however, may have certain drawbacks, for example, while LBR takes up minimal overhead, it is limited in the amount of performance-related information it can store and BTS causes drastic run-time slowdown. Accordingly, scaling the hardware techniques of the CPU to be applied to the GPU would multiply the effects of the drawback on the GPU, thereby rendering the results inaccurate and unusable.

Aspects of the present disclosure address the above and other deficiencies by providing a call stack for each execution thread of a processor (e.g., processing device). In particular, a call stack identifier of an execution thread (associated with the call stack) is provided based on a branch identifier (assigned to an instruction executed on the execution thread). Each execution thread of a processing device may be associated with a hardware register used to store the call stack identifier, which may be a numerical representation of a call stack. The call stack is a historical sequence of functions from an active function to the main function (or a sequence of returns from the active function to the main function). The branch identifier may indicate a numerical representation of a branch (or transition) between two functions. Depending on the embodiment, specific branch-type instructions (e.g., branch-relative (BRA), branch-absolute (JMP), call-subroutine (CALL), return-from-subroutine (RET)) include a branch identifier.

A state transition data structure is used to identify the call stack of the execution thread based on the branch identifier. Each row of the state transition data structure is indexed by a unique numerical identifier of a state or edge of the application. Each state is defined as a function of the application in a state transition graph (e.g., control flow graph). Each edge is defined as a path between functions of the application in the state transition graph. A column of the state transition data structure provides a numerical identifier of a new call stack (e.g., new call stack identifier or new value of the call stack identifier). The new call stack identifier is a numeral representation of a call stack after a transition from the state or edge. Accordingly, the new call stack identifier is obtained by querying the state transition data structure by the unique numerical identifier.

The unique numerical identifier used as an index value to query the state transition table. The index value is calculated by adding the call stack identifier of the execution thread and the branch identifier of the instruction to be executed on the execution thread. The new call stack identifier may be stored in the hardware register of the execution thread. Depending on the embodiment, the instruction may be assigned an update call stack flag (e.g., a boolean value) indicating whether the processing device should update the hardware register with the new call stack identifier. For example, for branch type instructions of interest to a profiler the update call stack flag is true and for branches not of interest, the update call stack flag is false.

Advantages of the present disclosure include, but are not limited to, real-time, tracking of an application's execution. In particular, without changes to the characteristics of the application and while minimizing and/or eliminating overhead and performance penalties, the present disclosure may generate a call stack for instructions executed by one or more execution threads. As a result, the application can be executed and ran at native speed while providing tracing used, for example, for hot spot detection.

It should be noted that the GPU, CPU or other terms used with reference to processor or processing unit are used herein for illustration only. Aspects of the present disclosure can be similarly applied to any other of processors or processing units to measure application performance.

FIG. 1 is a block diagram of a graphics processing unit (GPU) 100 that includes one or more streaming multiprocessors (SMs) 110 and a global memory 170, in accordance with at least one embodiment of the present disclosure.

Each of the SMs 110 includes a shared memory 120, instruction pipeline(s) 122, register file 124, warp state(s) 132, dispatch unit 136, warp scheduler 142, and instruction cache 180. The global memory 170 includes a list of executable instructions 172 associated with an application.

A subset of the list of executable instructions 172 may be loaded from the global memory 170 to an instruction cache 180 of one of the SMs 110. The warp scheduler 142 may maintain a pool of warps. The warp scheduler 142 may issue instructions for the pool of warps. Each warp is a grouping of threads such that all the threads in the warp execute the same instruction. Each thread stores a thread state in the register file 124. Each warp of the pool of warps stores a warp state (e.g., warp states 132) describing a warp's readiness to execute its next instruction. Accordingly, on every cycle, the warp scheduler 142 issues (e.g., selects) a warp ready to execute an instruction retrieved from the instruction cache 180 based on the warp state (e.g., warp states 132). The dispatch unit 136 dispatches the selected warp to an execution pipeline (e.g., one of the instruction pipelines 122). The results of the execution is stored in the register file 124, in shared memory 120, or global memory 170.

Each of the SMs 110 may further include a call stack attribution logic 150 to provide a call stack. Call stack refers to information about the active subroutines of an application. The call stack attribution logic 150 may include a call stack update component 154. In some embodiments, the call stack attribution logic 150 may be circuitry logic separate from any of the components of each of the SMs 110 or part of a component of each of the SMs 110. For example, the call stack attribution logic 150 may be a component in each of the SMs 110, a component in the dispatch unit 136 of each of the SMs 110, or a component in the warp scheduler 142 of each of the SMs 110. Each component of the call stack attribution logic 150 may be collectively or separately located in various components in each of the SMs 110.

The compiler and/or performance monitoring software (e.g., a profiler) may modify one or more of the list of executable instructions 172. In one embodiment, the compiler and/or profiler modifies each instruction by adding call stack metadata (e.g., additional call stack related bits) to branch-type instructions. In another embodiment, the compiler and/or profiler may insert an additional call stack related instruction prior to and/or after each branch-type instruction to update a call stack. Branch-type instructions include, for example, BRA, JMP, CALL, and RET. The call stack metadata may include one or more bits for branch identifier. The branch identifier may indicate a unique branch between unique instances of functions. In some embodiments, the call stack metadata may include one or more additional bits for an update call stack flag. The update call stack flag (e.g., a boolean value) may indicate whether the call stack needs to be updated. In some embodiments, one or more of the list of executable instructions 172 may include modified instructions provided by the compiler and/or profiler. Accordingly, the compiler and/or profiler need not modify one or more of the list of executable instructions 172.

The compiler or profiler may obtain from an instruction of the list of executable instructions 172 call stack metadata (e.g., branch identifier and/or update call stack flag). The call stack metadata (e.g., the branch identifier of the call stack metadata) is used, in conjunction with a state transition data structure 174, to determine a new call stack identifier (e.g., is a numerical representation of a call stack after the execution of the instruction by the execution thread) for the execution thread executing the instruction. Depending on the embodiment, the call stack update component 154 may be executed in parallel with the core logic executing the instruction.

The state transition data structure 174, as noted above, includes a plurality of rows, each indexed by a unique numerical identifier of a state or edge of the application. Each state is defined as a function of the application in a state transition graph (e.g., control flow graph). Each edge is defined as a path between functions of the application in the state transition graph. A column of the state transition data structure provides a numerical identifier of a new call stack (e.g., new call stack identifier or new value of the call stack identifier). The new call stack identifier is a numerical representation of a call stack after a transition from the state or edge. Accordingly, the new call stack identifier is obtained by querying the state transition data structure by the unique numerical identifier.

Depending on the embodiment, the state transition data structure 174 is generated by the profiler. For example, the profiler may store the state transition data structure 174 in global memory 170, shared memory 120, or any component of the GPU 100 (e.g., the dispatch unit 136 of each of the SMs 110 or the warp scheduler 142 of each of the SMs 110).

Accordingly, the call stack update component 154 identifies whether the update call stack flag associated with the instruction is set to true. Based on the value of the update call stack flag, the call stack update component 154 adds the call stack identifier of the execution thread and the branch identifier of the instruction. The sum of the addition of the call stack identifier of the execution thread and the branch identifier of the instruction is used as an index value to query the state transition data structure. The new call stack identifier, obtained from the state transition data structure, may be stored in a hardware register (e.g., call stack register) of the warp state(s) 132 and/or register file 124. Depending on the embodiment, each warp state of the warp state(s) 132 may be extended to include a per-warp call stack register to store the new call stack identifier for the warp. Additionally and/or alternatively, each thread state of the register file 124 may be extended to include per-thread call stack register to store the new call stack identifier.

In some embodiments, the call stack update component 154 may prevent updating of the call stack identifier of the execution thread. In particular, based on a number of bits necessary for each call stack identifier (e.g., N bits), the call stack update component 154 sets a predetermined threshold call stack identifier to a value equivalent to a total number of possible combinations for the number of bits (e.g., $2^N - 1$). Accordingly, when the call stack update component 154 determines whether to obtain a new call stack identifier based on the update call stack flag, the call stack update component 154 also determines whether the call stack identifier of the execution thread equals the predetermined threshold call stack identifier. If the call stack identifier of the execution thread equals the predetermined threshold call stack identifier, the call stack update component 154 will not obtain a new call stack identifier. Otherwise, the call stack update component 154 will proceed with obtaining a new call stack identifier.

Depending on the embodiment, each of the SMs 110 may include a branch predictor that computes a branch taken value whether a conditional branch would be satisfied and taken before it is definitively known. For example, conditional jump instruction refers to a two-way branching in which the conditional jump can either be "taken" and jump to a target instruction, or it can be "not taken" and continue execution immediately after the conditional jump. Target instruction includes a target address that points at the "taken" path. Accordingly, the call stack update component 154 may add the branch taken value to the call stack identifier of the execution thread and the branch identifier of the instruction to be used as an index value to query the state transition data structure.

Depending on the embodiment, each of the SMs 110 may include a program counter (PC) sampler 144. The PC sampler 144 selects a warp based on a configurable criteria in response to an event and outputs a packet of information. Typically, the packet of information, for example, may include the selected warp's identification, the warp's program counter, the warp scheduler state, stall reasons, and etc. The PC sampler 144 may further include a call stack identifier of a selected warp in the packet of information.

Depending on the embodiment, the state transition data structure 174 may further include, for each record, additional metadata to be fed into other systems (or logic) of the GPU 100 (or each of the SMs 110). In particular, certain systems of the GPU 100 will only be activated while a specific function is being executed. Thus, based on the record of the state transition data structure 174 containing either the metadata or a predetermined value for the metadata will activate the logic of the GPU 100 for the specific function.

For example, each of the SMs 110 may include a performance monitor 140 (e.g., a system) which observes a unit (or component) by incrementing a hardware counters based upon a per cycle state of the unit event signal. Each event signal is provided by the unit to the performance monitor. The additional metadata may be, for example, a filter flag (e.g., a boolean value). Each warp state of the warp state(s) 132 and/or each thread state of the register file 124 may also be extended to include a filter register. The performance monitor 140 may filter event signals based on the value of the filter flag and/or the call stack identifier (e.g., count instructions executed if call stack identifier equals a set value).

Accordingly, based on the filter flag, the filter register is updated as the call stack identifier of the execution thread is updated during execution of the instruction, such that the filter register will accompany each instruction. Thus, the performance monitor may monitor from various points inside the GPU instruction specific signals and the filter register.

In some embodiments, the GPU 100 may include tracing capabilities. Tracing involves a specialized use of logging to record information about an application's execution. In some embodiments, tracing may be implemented via an interface. The interface, such as JTAG, are used to read and receive the internal state of the processor (e.g. GPU 100). Thus, the call stack may be included with the internal state of the processor. The internal state (and the call stack) may be read continuously, periodically, and or conditionally.

In another embodiment, tracing may be inserting instructions into instruction lists of the application to emit information (e.g., the architecturally visible state of the processor). Architecturally visible state refers to any state that can be copied into a data register and/or written to memory. The call stack identifiers associated with each warp and/or thread may be included in the architecturally visible state. Thus, in one instance, instructions to copy the call stack into a data register may be inserted into the list of executable instructions 172. In another instance, instructions to write the call stack into memory may be inserted into the list of executable instructions 172.

In an alternative embodiment, the call stack attribution logic 150 may be implemented into a central processing unit (CPU) to provide a call stack to each thread of each logical core of the CPU executing an instruction. Additionally and/or alternatively, existing tracing logic of the CPU, such as last branch record (LBR) and branch trace store (BTS) may be modified to include the call stack for each traced branch.

Figure 2:
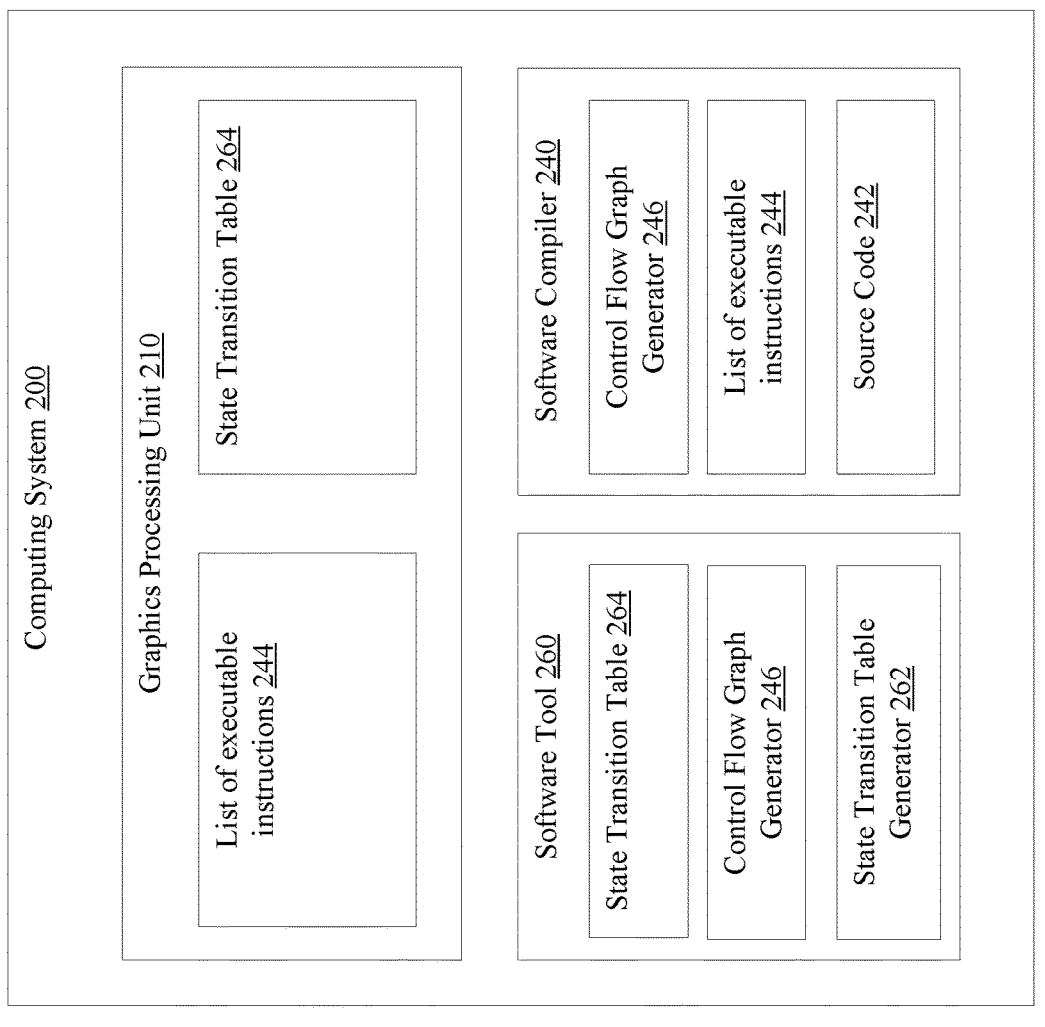
FIG. 2 is a block diagram of a computing system used to generate a state transition data structure for hardware driven call stack attribution, in accordance with at least one embodiment.

FIG. 2 is a block diagram of a computing system 200 used to generate a state transition table, in accordance with at least one embodiment of the present disclosure. The computing system 200 includes a graphics processing unit 210, software tool 260, and a software compiler 240.

The software compiler 240 is a program used to translate source code 242 of an application to a list of executable instructions 244 to be executed on a processor, such as, the graphics processing unit (GPU) 210. The list of executable instructions 244 may be stored on GPU 210, similar to the GPU 100 of FIG. 1. The source code 242 or the list of executable instructions 244 may be converted into a control flow graph by a control flow graph generator (e.g., a control flow graph generator 246 of the software compiler 240 or the software tool 260). The control flow graph is a representation, using graph notation, of all paths that might be traversed through the application during its execution.

Once the list of executable instructions 244 is converted into a control flow graph, a state transition data structure generator 262 of the software tool 260 may utilize the control flow graph to generate a state transition data structure 264. The state transition data structure may be stored on the graphics processing unit 210.

Figure 3:
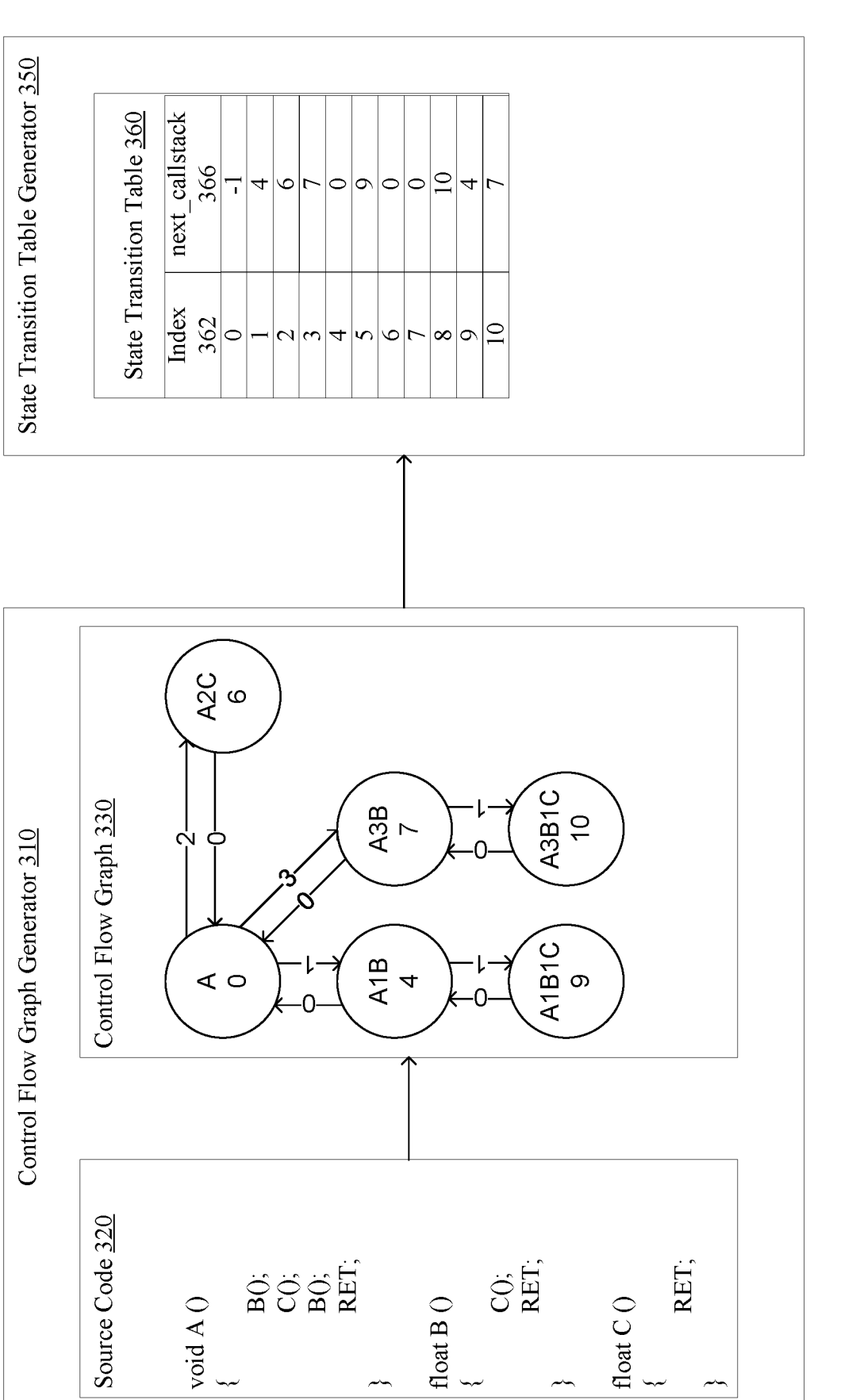
FIG. 3 illustrates generating a state transition data structure for hardware-driven call stack attribution, in accordance with at least one embodiment.

FIG. 3 illustrates a diagram of a control flow graph generator 310, similar to the control flow graph generator 246 of FIG. 2, generating a control flow graph from the source code. Source code 320 may be retrieved from a software compiler, similar to the software compiler 240 of FIG. 2.

The control flow graph generator 310 receives from the software compiler a source code 320 of an application. The source code 320 may be converted into a graphical representation of a non-deterministic finite automaton (NFA) (not shown). NFA represents a finite state machine whose transition function maps inputs symbols and states to a set of next states. NFA of the source code 320 may be converted into a control flow graph 330 (e.g., a graphical representation of a deterministic finite automaton (DFA)). DFA represents a finite state machine with at most one transition for each symbol and state. Accordingly, the graphical representation of the DFA 330 represents each function as a state and each branch between states as an edge.

Each state and edge(s) is sequentially assigned a unique numerical identifier until the end of the graphical representation of the DFA is reached. For example, each unique numerical identifier is incrementally assigned (e.g., starting with 0) to a state and each edge of the state (e.g., sequentially according to the graphical representation of the DFA). Then proceeds to the next state based on an order of the edges from the state.

The state transition data structure generator 350 receives the control flow graph 330 from the control flow graph generator 310. The state transition data structure generator 350 incrementally inserts, in a state transition data structure 360, a record for each unique numerical identifier. Each record, indexed by the unique numerical identifier (e.g., index value 362), may include a new call stack identifier 366. Once the state transition data structure 360 is generated, the state transition data structure generator 350 may store the state transition data structure 360 in the GPU, similar to GPU 210 of FIG. 2 or GPU 100 of FIG. 1.

FIG. 4 depicts a flow diagram of an example method 400 for modifying instructions of a list of executable instructions by an instruction modification component of a call stack attribution logic, in accordance with one or more aspects of the present disclosure. The method may be performed by processing logic that may comprise hardware (circuitry, dedicated logic, etc.), computer-readable instructions (run on a general purpose computer system or a dedicated machine), or a combination of both. In an illustrative example, one or more operations of method 400 may be performed by a processor, such as a graphics processing unit (not shown). Alternatively, some or all of the operations of method 400 might be performed by another module or machine. It should be noted that blocks depicted in FIG. 4 could be performed simultaneously or in a different order than that depicted, and may be performed by the same hardware, firmware or software or by different hardware, firmware and/or software.

At block 410, the processing logic receives a set of executable instructions. The list of executable instructions is a translation of source code of an application. The list of executable instructions may be stored in global memory of the GPU. Depending on the embodiment, the list of executable instructions may be copied into the instruction modification component or into shared memory associated with the SM in which the instruction modification component is located.

At block 420, the processing logic traverses a set of executable instructions. Traversing the list of executable instructions includes analyzing, instruction by instruction, the entire set of executable instructions. At block 430, the processing logic, identifies a function entry point in the list of executable instructions (e.g., identified instruction). The function entry point refers to a point in the list of executable instructions where the execution of the function begins. In some embodiments, the list of executable instructions may include various instructions before and between function entry points.

At block 440, the processing logic determines whether an opcode of a target instruction matches a branch-type instruction. The identified function of the application may include various instructions. The opcode associated with the instruction determines the type of instruction. The branch-type instructions may include BRA, JMP, CALL, and RET. If no, the processing logic proceeds to block 440. In particular, the instructions of the identified function are traversed until an instruction that matches the branch-type instructions is identified.

If yes, at block 450, the processing logic determines whether an opcode of the target instruction is RET and, at block 460, the processing logic modifies the instruction to include a branch identifier of zero. In some embodiments, modifying the instruction includes adding (e.g., encoding)

additional bits of the instruction to include the branch identifier. Depending on the embodiment, additional bits may be encoded to include an update call stack flag indicating whether to update the call stack identifier of an execution thread.

If no, at block 470, the processing logic modifies the instruction to include a unique branch identifier. In some embodiments, the unique branch identifier is chosen by starting at an initial value (e.g., 1) and incrementing (e.g., by 1) the unique branch identifier after each instruction modification. In some embodiments, modifying the instruction includes encoding additional bits of the instruction to include the branch identifier. In other embodiments, the modification of the instructions are based on the state transition data structure.

FIG. 5 illustrates a diagram of an instruction modification component 500, similar to the update component 154 of FIG. 1, modifying instructions of a set of executable instructions.

List of executable instructions 510 may be retrieved from a global memory of the GPU, similar to GPU 100 of FIG. 1. The instruction modification component 500 traverses the list of executable instructions 510 (e.g., 520A-M) and 560 (e.g., 570A-M). The instruction modification component 500 identifies a program or function entry point (e.g., 520C and 520E). As previously described, the program (or function) entry point refers to a point in the list of executable instructions where the execution of the application (or function) begins. The instruction modification component 500 continues to traverse the list of executable instructions 510 to identify a branch-type instruction (e.g., 520C and 520E). To determine whether an instruction is a branch-type instruction, the instruction modification component 500 compares the opcode of the instruction with each branch-type instruction (e.g., an instruction BRA, JMP, CALL, and RET).

If the opcode is one of the branch-type instructions, the instruction modification component 500 modifies a branch identifier (e.g., instruction 520C becomes instruction 570C and instruction 520E becomes instruction 570E). The branch identifiers are determined for each grouping of instructions within a function by incrementally assigning a unique branch identifier to each branch-type instruction, starting with an initial value (e.g., 1). Once a new function begins, the unique branch identifier restarts from the initial value and incrementally assigns the unique branch identifier to each branch-type instruction of the new function.

In some embodiments, the instruction may be further modified to include an update call stack flag (e.g., update-_callstack) (e.g., a boolean value of 1 representing true or 0 representing false). The update call stack flag indicates whether to update a call stack identifier of the execution thread. Accordingly, each branch-type instruction receives an update call stack flag of 1 (e.g. 570C and 570E). In one embodiment, non-branch-type instructions may be modified to include a null value for the branch identifier (and the update call stack flag) to indicate that the call stack identifier of the execution thread should not be updated. In another embodiment, non-branch-type instructions may be modified to include an update call stack flag of 0 to indicate that the call stack identifier of the execution thread should not be updated.

FIG. 6 depicts a flow diagram of an example method 600 for updating the call stack identifier of the execution thread by a call stack update component of the call stack attribution logic, in accordance with one or more aspects of the present disclosure. The method may be performed by processing logic that may comprise hardware (circuitry, dedicated logic, etc.), computer readable instructions (run on a general purpose computer system or a dedicated machine), or a combination of both. In an illustrative example, one or more operations of method 600 may be performed by a processor, such as a graphics processing unit (not shown). Alternatively, some or all of the operations of method 600 might be performed by another module or machine. It should be noted that blocks depicted in FIG. 6 could be performed simultaneously or in a different order than that depicted, and may be performed by the same hardware, firmware or software or by different hardware, firmware and/or software.

At block 610, for each instruction, the processing logic determines a branch identifier associated with an instruction being executed by an execution thread. The branch identifier may indicate a numerical representation of a branch (or transition) between two functions.

At block 620, the processing logic identifies a call stack identifier of the execution thread executing the instruction. The call stack identifier of the execution thread is a numerical representation of a call stack (e.g., an active function). As previously described, the call stack is a historical sequence of functions from an active function to the main function (or a sequence of returns from the active function to the main function). Each execution thread has a corresponding hardware register to store the call stack identifier of the execution thread.

At block 630, the processing logic updates the call stack identifier of the execution thread based on the call stack identifier of the execution thread and the branch identifier. As previously described, in one embodiment, the processing logic updates the call stack identifier of the execution thread to the new call stack identifier by determining whether the instruction is a branch type (e.g., one of BRA, JMP, CALL, or RET). In another embodiment, the processing logic updates the call stack identifier of the execution thread by determining whether an update call stack flag associated with the instruction is set to true. The update call stack flag may be a boolean value indicating whether to update the call stack identifier of the execution thread to the new call stack identifier.

To update the call stack identifier of the execution thread based on the call stack identifier of the execution thread and the branch identifier, the processing logic calculates an index value to query the state transition table by adding the call stack identifier of the execution thread and the branch identifier of the instruction to be executed on the execution thread. In some embodiments, the index value may be calculated by adding a branch taken value to the call stack identifier of the execution thread and the branch identifier of the instruction to be used as an index value to queries the state transition data structure.

As previously described, the state transition data structure is used to identify the call stack of the execution thread based on the branch identifier. The state transition data structure includes a plurality of rows, each indexed by a unique numerical identifier of a state or edge of the application. Each state is defined as a function of the application in a state transition graph (e.g., control flow graph). Each edge is defined as a path between functions of the application in the state transition graph. A column of the state transition data structure provides a numerical identifier of a new call stack (e.g., new call stack identifier or new value of the call stack identifier). The new call stack identifier is a numeral representation of a call stack after a transition from the state or edge. Accordingly, the new call stack identifier is obtained by querying the state transition data structure by the unique numerical identifier.

The processing logic queries, based on the calculated index value, the state transition data structure for a new call stack identifier. The processing logic replaces the call stack identifier of the execution thread with a new call stack identifier.

FIG. 7 depicts a flow diagram of an example method 700 for generating call stacks within a processing device during execution of an application, in accordance with one or more aspects of the present disclosure. The method may be performed by processing logic that may comprise hardware (circuitry, dedicated logic, etc.), computer readable instructions (run on a general purpose computer system or a dedicated machine), or a combination of both. In an illustrative example, one or more operations of method 700 may be performed by a processor, such as a graphics processing unit (not shown). Alternatively, some or all of the operations of method 700 might be performed by another module or machine. It should be noted that blocks depicted in FIG. 7 could be performed simultaneously or in a different order than that depicted, and may be performed by the same hardware, firmware or software or by different hardware, firmware and/or software.

At block 710, the processing logic receives a state transition data structure associated with an application to be executed. As previously described, the state transition data structure is used to identify the call stack of the execution thread based on the branch identifier. Each row of the state transition data structure, which is indexed by a unique numerical identifier of a state of the application. Each state is defined by a state transition of the application (e.g., control flow graph). A column of the state transition data structure provides a numerical identifier of a new call stack (e.g., new call stack identifier). Accordingly, the new call stack identifier is obtained by querying the state transition data structure by the unique numerical identifier.

At block 720, the processing logic encodes each instruction associated with the application with a branch identifier. As previously described, call stack metadata is added to each branch type instruction. The call stack metadata include a branch identifier and/or an update call stack flag.

At block 730, responsive to execution of an instruction on an execution thread, the processing logic obtains, from the state transition data structure, a new call stack identifier based on a call stack identifier of the execution thread and the branch identifier of the instruction. Each warp and/or execution thread may include a register to store a call stack identifier of the execution thread. As previously described, the processing logic calculates an index value, which is a sum of a call stack identifier of the execution thread and a branch identifier of the instruction. In some embodiments, the index value may further include in the sum a branch taken value. The state transition data structure is queried using the index value. The record associated with the index value includes a new call stack identifier. The call stack identifier of the execution thread may be updated with the new call stack identifier. Accordingly, the register associated with the execution thread executing the instruction is updated with the new call stack identifier.

Figure 8:
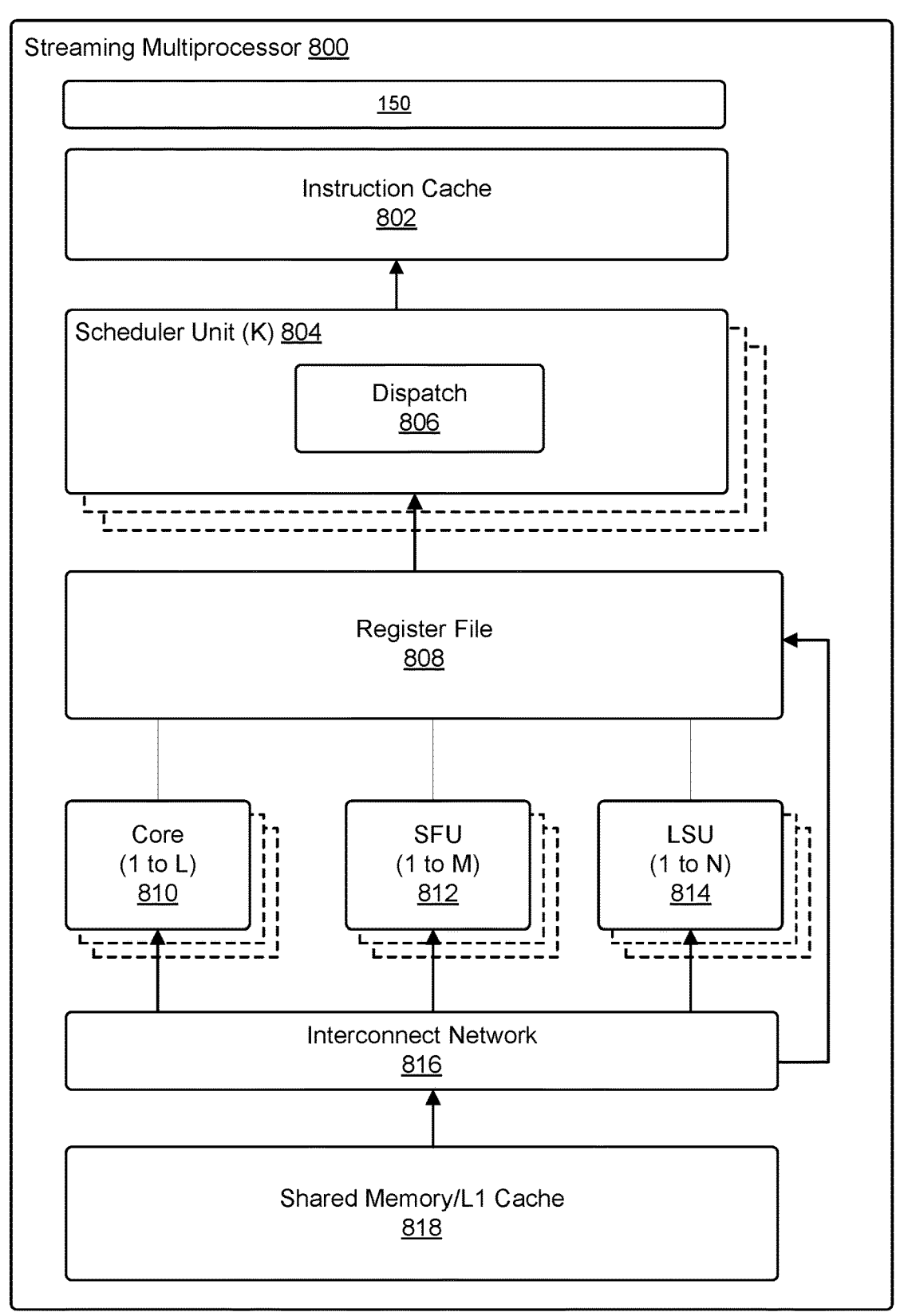
FIG. 8 illustrates a streaming multi-processor, in accordance with at least one embodiment.

FIG. 8 illustrates a streaming multi-processor ("SM") 800, according to at least one embodiment. In at least one embodiment, SM 800 is SM of FIG. 8. In at least one embodiment, SM 800 includes an instruction cache 802, one or more scheduler units 804, a register file 808, one or more processing cores ("cores") 810, one or more special function units ("SFUs") 812, one or more load/store units ("LSUs")

814, an interconnect network 816, a shared memory/level one ("L1") cache 818, and/or any suitable combination thereof.

In at least one embodiment, a work distribution unit dispatches tasks for execution on general processing clusters ("GPCs") of parallel processing units ("PPUs") and each task is allocated to a particular Data Processing Cluster ("DPC") within a GPC and, if a task is associated with a shader program, that task is allocated to one of SMs 800. In at least one embodiment, scheduler unit 804 receives tasks from a work distribution unit and manages instruction scheduling for one or more thread blocks assigned to SM 800. In at least one embodiment, scheduler unit 804 schedules thread blocks for execution as warps of parallel threads, wherein each thread block is allocated at least one warp. In at least one embodiment, each warp executes threads. In at least one embodiment, scheduler unit 804 manages a plurality of different thread blocks, allocating warps to different thread blocks and then dispatching instructions from plurality of different cooperative groups to various functional units (e.g., processing cores 810, SFUs 812, and LSUs 814) during each clock cycle.

In at least one embodiment, Cooperative Groups may refer to a programming model for organizing groups of communicating threads that allows developers to express granularity at which threads are communicating, enabling expression of richer, more efficient parallel decompositions. In at least one embodiment, cooperative launch APIs support synchronization amongst thread blocks for execution of parallel algorithms. In at least one embodiment, applications of conventional programming models provide a single, simple construct for synchronizing cooperating threads: a barrier across all threads of a thread block (e.g., syncthreads( ) function). However, in at least one embodiment, programmers may define groups of threads at smaller than thread block granularities and synchronize within defined groups to enable greater performance, design flexibility, and software reuse in form of collective group-wide function interfaces. In at least one embodiment, Cooperative Groups enables programmers to define groups of threads explicitly at sub-block (i.e., as small as a single thread) and multi-block granularities, and to perform collective operations such as synchronization on threads in a cooperative group. In at least one embodiment, that programming model supports clean composition across software boundaries, so that libraries and utility functions can synchronize safely within their local context without having to make assumptions about convergence. In at least one embodiment, Cooperative Groups primitives enable new patterns of cooperative parallelism, including producer-consumer parallelism, opportunistic parallelism, and global synchronization across an entire grid of thread blocks.

In at least one embodiment, a dispatch unit 806 is configured to transmit instructions to one or more functional units and scheduler unit 804 and includes two dispatch units 806 that enable two different instructions from a common warp to be dispatched during each clock cycle. In at least one embodiment, each scheduler unit 804 includes a single dispatch unit 806 or additional dispatch units 806.

In at least one embodiment, each SM 800, in at least one embodiment, includes register file 808 that provides a set of registers for functional units of SM 800. In at least one embodiment, register file 808 is divided between each functional unit such that each functional unit is allocated a dedicated portion of register file 808. In at least one embodiment, register file 808 is divided between different warps being executed by SM 800 and register file 808 provides temporary storage for operands connected to data paths of functional units. In at least one embodiment, each SM 800 comprises a plurality of L processing cores 810, where L is a positive integer. In at least one embodiment, SM 800 includes a large number (e.g., 128 or more) of distinct processing cores 810. In at least one embodiment, each processing core 810 includes a fully-pipelined, single-precision, double-precision, and/or mixed precision processing unit that includes a floating point arithmetic logic unit and an integer arithmetic logic unit. In at least one embodiment, floating point arithmetic logic units implement IEEE 754-2008 standard for floating point arithmetic. In at least one embodiment, processing cores 810 include 64 single-precision (32-bit) floating point cores, 64 integer cores, 32 double-precision (64-bit) floating point cores, and 8 tensor cores.

Tensor cores are configured to perform matrix operations in accordance with at least one embodiment. In at least one embodiment, one or more tensor cores are included in processing cores 810. In at least one embodiment, tensor cores are configured to perform deep learning matrix arithmetic, such as convolution operations for neural network training and inferencing. In at least one embodiment, each tensor core operates on a 4×4 matrix and performs a matrix multiply and accumulate operation, D=A×B+C, where A, B, C, and D are 4×4 matrices.

In at least one embodiment, matrix multiply inputs A and B are 16-bit floating point matrices and accumulation matrices C and D are 16-bit floating point or 32-bit floating point matrices. In at least one embodiment, tensor cores operate on 16-bit floating point input data with 32-bit floating point accumulation. In at least one embodiment, 16-bit floating point multiply uses 64 operations and results in a full precision product that is then accumulated using 32-bit floating point addition with other intermediate products for a 4×4×4 matrix multiply. Tensor cores are used to perform much larger two-dimensional or higher dimensional matrix operations, built up from these smaller elements, in at least one embodiment. In at least one embodiment, an API, such as a CUDA 9 C++ API, exposes specialized matrix load, matrix multiply and accumulate, and matrix store operations to efficiently use tensor cores from a CUDA-C++ program. In at least one embodiment, at a CUDA level, a warp-level interface assumes 16×16 size matrices spanning all 32 threads of warp.

In at least one embodiment, each SM 800 comprises M SFUs 812 that perform special functions (e.g., attribute evaluation, reciprocal square root, and like). In at least one embodiment, SFUs 812 include a tree traversal unit configured to traverse a hierarchical tree data structure. In at least one embodiment, SFUs 812 include a texture unit configured to perform texture map filtering operations. In at least one embodiment, texture units are configured to load texture maps (e.g., a 2D array of texels) from memory and sample texture maps to produce sampled texture values for use in shader programs executed by SM 800. In at least one embodiment, texture maps are stored in shared memory/L1 cache 818. In at least one embodiment, texture units implement texture operations such as filtering operations using mip-maps (e.g., texture maps of varying levels of detail), in accordance with at least one embodiment. In at least one embodiment, each SM 800 includes two texture units.

Each SM 800 comprises N LSUs 814 that implement load and store operations between shared memory/L1 cache 818 and register file 808, in at least one embodiment. Interconnect network 816 connects each functional unit to register file 808 and LSU 814 to register file 808 and shared memory/L1 cache 818 in at least one embodiment. In at least one embodiment, interconnect network 816 is a crossbar that can be configured to connect any functional units to any registers in register file 808 and connect LSUs 814 to register file 808 and memory locations in shared memory/L1 cache 818.

In at least one embodiment, shared memory/L1 cache 818 is an array of on-chip memory that allows for data storage and communication between SM 800 and primitive engine and between threads in SM 800, in at least one embodiment. In at least one embodiment, shared memory/L1 cache 818 comprises 128 KB of storage capacity and is in a path from SM 800 to a partition unit. In at least one embodiment, shared memory/L1 cache 818, in at least one embodiment, is used to cache reads and writes. In at least one embodiment, one or more of shared memory/L1 cache 818, L2 cache, and memory are backing stores.

Combining data cache and shared memory functionality into a single memory block provides improved performance for both types of memory accesses, in at least one embodiment. In at least one embodiment, capacity is used or is usable as a cache by programs that do not use shared memory, such as if shared memory is configured to use half of a capacity, and texture and load/store operations can use remaining capacity. Integration within shared memory/L1 cache 818 enables shared memory/L1 cache 818 to function as a high-throughput conduit for streaming data while simultaneously providing high-bandwidth and low-latency access to frequently reused data, in accordance with at least one embodiment. In at least one embodiment, when configured for general purpose parallel computation, a simpler configuration can be used compared with graphics processing. In at least one embodiment, fixed function graphics processing units are bypassed, creating a much simpler programming model. In a general purpose parallel computation configuration, a work distribution unit assigns and distributes blocks of threads directly to DPCs, in at least one embodiment. In at least one embodiment, threads in a block execute a common program, using a unique thread ID in calculation to ensure each thread generates unique results, using SM 800 to execute program and perform calculations, shared memory/L1 cache 818 to communicate between threads, and LSU 814 to read and write global memory through shared memory/L1 cache 818 and memory partition unit. In at least one embodiment, when configured for general purpose parallel computation, SM 800 writes commands that scheduler unit 804 can use to launch new work on DPCs.

In at least one embodiment, a PPU is included in or coupled to a desktop computer, a laptop computer, a tablet computer, servers, supercomputers, a smart-phone (e.g., a wireless, hand-held device), personal digital assistant ("PDA"), a digital camera, a vehicle, a head mounted display, a hand-held electronic device, and more. In at least one embodiment, a PPU is embodied on a single semiconductor substrate. In at least one embodiment, a PPU is included in a system-on-a-chip ("SoC") along with one or more other devices such as additional PPUs, memory, a reduced instruction set computer ("RISC") CPU, a memory management unit ("MMU"), a digital-to-analog converter ("DAC"), and like.

In at least one embodiment, a PPU may be included on a graphics card that includes one or more memory devices. In at least one embodiment, that graphics card may be configured to interface with a PCIe slot on a motherboard of a desktop computer. In at least one embodiment, that PPU may be an integrated graphics processing unit ("iGPU") included in chipset of a motherboard.

Call stack attribution logic 150 may be used to generate and update a call stack for each thread and/or warp associated with one or more embodiments. Details regarding call stack attribution logic 150 are provided herein in conjunction with FIG. 1. In at least one embodiment, call stack attribution logic 150 and the call stack it may generate may be used in the software tool of FIG. 2 for profiling.

Figure 9:
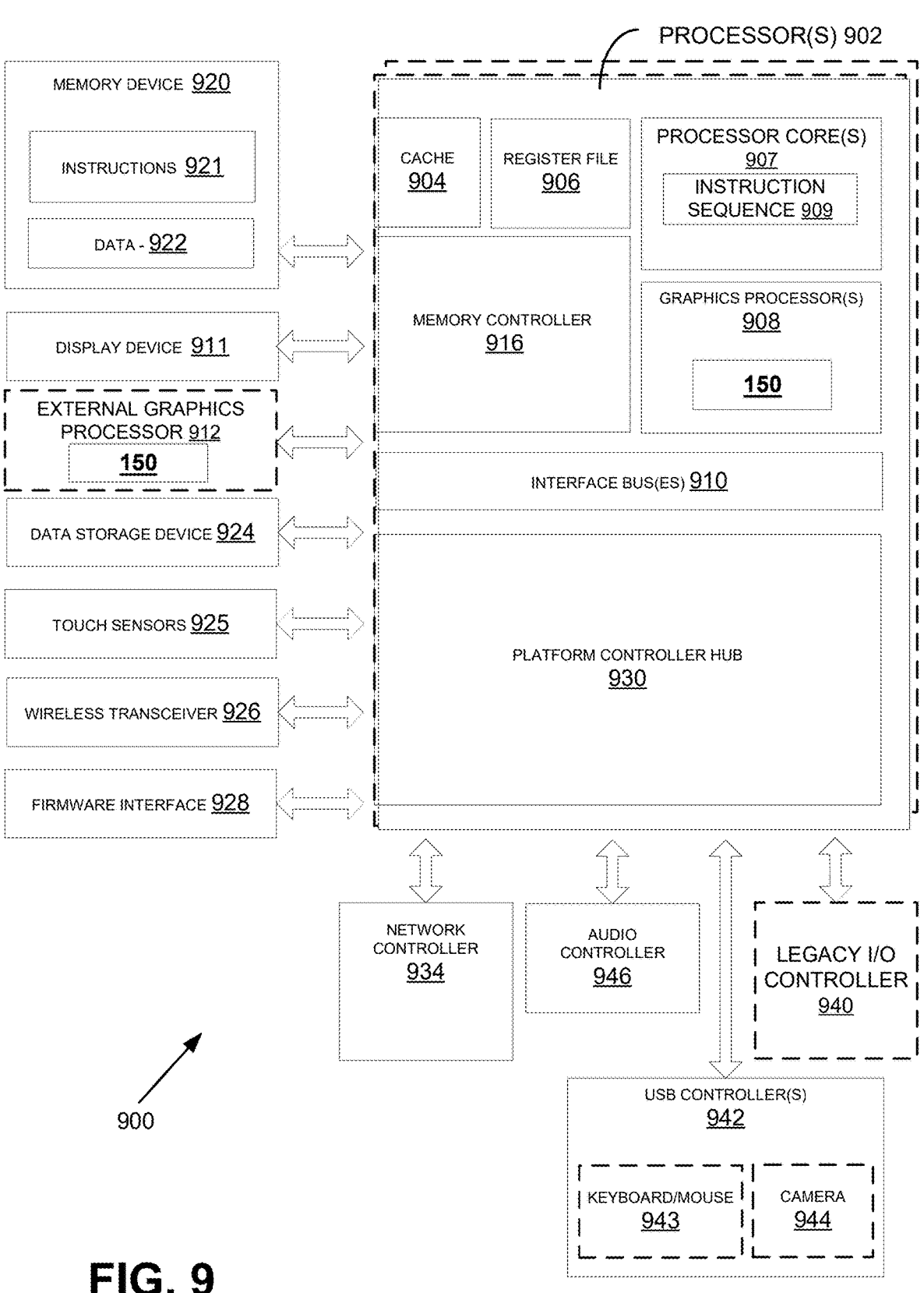
FIG. 9 is a block diagram illustrating a computer system, in accordance with at least one embodiment.

FIG. 9 is a block diagram of a processing system, according to at least one embodiment. In at least one embodiment, system 900 includes one or more processors 902 and one or more graphics processors 908, and may be a single processor desktop system, a multiprocessor workstation system, or a server system having a large number of processors 902 or processor cores 907. In at least one embodiment, system 900 is a processing platform incorporated within a system-on-a-chip (SoC) integrated circuit for use in mobile, handheld, or embedded devices.

In at least one embodiment, system 900 can include, or be incorporated within, a server-based gaming platform, a game console, including a game and media console, a mobile gaming console, a handheld game console, or an online game console. In at least one embodiment, system 900 is a mobile phone, a smart phone, a tablet computing device or a mobile Internet device. In at least one embodiment, processing system 900 can also include, couple with, or be integrated within a wearable device, such as a smart watch wearable device, a smart eyewear device, an augmented reality device, or a virtual reality device. In at least one embodiment, processing system 900 is a television or set top box device having one or more processors 902 and a graphical interface generated by one or more graphics processors 908.

In at least one embodiment, one or more processors 902 each include one or more processor cores 907 to process instructions which, when executed, perform operations for system and user software. In at least one embodiment, each of one or more processor cores 907 is configured to process a specific instruction sequence 909. In at least one embodiment, instruction sequence 909 may facilitate Complex Instruction Set Computing (CISC), Reduced Instruction Set Computing (RISC), or computing via a Very Long Instruction Word (VLIW). In at least one embodiment, processor cores 907 may each process a different instruction sequence 909, which may include instructions to facilitate emulation of other instruction sequences. In at least one embodiment, processor core 907 may also include other processing devices, such a Digital Signal Processor (DSP).

In at least one embodiment, processor 902 includes a cache memory 904. In at least one embodiment, processor 902 can have a single internal cache or multiple levels of internal cache. In at least one embodiment, cache memory is shared among various components of processor 902. In at least one embodiment, processor 902 also uses an external cache (e.g., a Level-3 (L3) cache or Last Level Cache (LLC)) (not shown), which may be shared among processor cores 907 using known cache coherency techniques. In at least one embodiment, a register file 906 is additionally included in processor 902, which may include different types of registers for storing different types of data (e.g., integer registers, floating point registers, status registers, and an instruction pointer register). In at least one embodiment, register file 906 may include general-purpose registers or other registers.

In at least one embodiment, one or more processor(s) 902 are coupled with one or more interface bus(es) 910 to transmit communication signals such as address, data, or control signals between processor 902 and other components in system 900. In at least one embodiment, interface bus 910 can be a processor bus, such as a version of a Direct Media Interface (DMI) bus. In at least one embodiment, interface bus 910 is not limited to a DMI bus, and may include one or more Peripheral Component Interconnect buses (e.g., PCI, PCI Express), memory busses, or other types of interface busses. In at least one embodiment processor(s) 902 include an integrated memory controller 916 and a platform controller hub 930. In at least one embodiment, memory controller 916 facilitates communication between a memory device and other components of system 900, while platform controller hub (PCH) 930 provides connections to I/O devices via a local I/O bus.

In at least one embodiment, a memory device 920 can be a dynamic random access memory (DRAM) device, a static random access memory (SRAM) device, flash memory device, phase-change memory device, or some other memory device having suitable performance to serve as process memory. In at least one embodiment, memory device 920 can operate as system memory for system 900, to store data 922 and instructions 921 for use when one or more processors 902 executes an application or process. In at least one embodiment, memory controller 916 also couples with an optional external graphics processor 912, which may communicate with one or more graphics processors 908 in processors 902 to perform graphics and media operations. In at least one embodiment, a display device 911 can connect to processor(s) 902. In at least one embodiment, display device 911 can include one or more of an internal display device, as in a mobile electronic device or a laptop device, or an external display device attached via a display interface (e.g., DisplayPort, etc.). In at least one embodiment, display device 911 can include a head mounted display (HMD) such as a stereoscopic display device for use in virtual reality (VR) applications or augmented reality (AR) applications.

In at least one embodiment, platform controller hub 930 enables peripherals to connect to memory device 920 and processor 902 via a high-speed I/O bus. In at least one embodiment, I/O peripherals include, but are not limited to, an audio controller 946, a network controller 934, a firmware interface 928, a wireless transceiver 926, touch sensors 925, a data storage device 924 (e.g., hard disk drive, flash memory, etc.). In at least one embodiment, data storage device 924 can connect via a storage interface (e.g., SATA) or via a peripheral bus, such as a Peripheral Component Interconnect bus (e.g., PCI, PCI Express). In at least one embodiment, touch sensors 925 can include touch screen sensors, pressure sensors, or fingerprint sensors. In at least one embodiment, wireless transceiver 926 can be a Wi-Fi transceiver, a Bluetooth transceiver, or a mobile network transceiver such as a 3G, 4G, or Long Term Evolution (LTE) transceiver. In at least one embodiment, firmware interface 928 enables communication with system firmware, and can be, for example, a unified extensible firmware interface (UEFI). In at least one embodiment, network controller 934 can enable a network connection to a wired network. In at least one embodiment, a high-performance network controller (not shown) couples with interface bus 910. In at least one embodiment, audio controller 946 is a multi-channel high definition audio controller. In at least one embodiment, system 900 includes an optional legacy I/O controller 940 for coupling legacy (e.g., Personal System 2 (PS/2)) devices to system 900. In at least one embodiment, platform controller hub 930 can also connect to one or more Universal Serial Bus (USB) controllers 942 connect input devices, such as keyboard and mouse 943 combinations, a camera 944, or other USB input devices.

In at least one embodiment, an instance of memory controller 916 and platform controller hub 930 may be integrated into a discreet external graphics processor, such as external graphics processor 912. In at least one embodiment, platform controller hub 930 and/or memory controller 916 may be external to one or more processor(s) 902. For example, in at least one embodiment, system 900 can include an external memory controller 916 and platform controller hub 930, which may be configured as a memory controller hub and peripheral controller hub within a system chipset that is in communication with processor(s) 902.

In embodiments, external graphics processor 912 may include call stack attribution logic 150, which may be implemented in hardware in embodiments. Call stack attribution logic 150 may be used to generate and update a call stack for each thread and/or warp. Details regarding call stack attribution logic 150 is provided herein in conjunction with FIGS. 1 through 7. In at least one embodiment, call stack attribution logic 150 may be used in system 900 for generating a call stack for each thread and/or warp as described herein.

Other variations are within spirit of present disclosure. Thus, while disclosed techniques are susceptible to various modifications and alternative constructions, certain illustrated embodiments thereof are shown in drawings and have been described above in detail. It should be understood, however, that there is no intention to limit disclosure to specific form or forms disclosed, but on contrary, intention is to cover all modifications, alternative constructions, and equivalents falling within spirit and scope of disclosure, as defined in appended claims.

Use of terms "a" and "an" and "the" and similar referents in context of describing disclosed embodiments (especially in context of following claims) are to be construed to cover both singular and plural, unless otherwise indicated herein or clearly contradicted by context, and not as a definition of a term. Terms "comprising," "having," "including," and "containing" are to be construed as open-ended terms (meaning "including, but not limited to,") unless otherwise noted. "Connected," when unmodified and referring to physical connections, is to be construed as partly or wholly contained within, attached to, or joined together, even if there is something intervening. Recitation of ranges of values herein are merely intended to serve as a shorthand method of referring individually to each separate value falling within range, unless otherwise indicated herein and each separate value is incorporated into specification as if it were individually recited herein. In at least one embodiment, use of term "set" (e.g., "a set of items") or "subset" unless otherwise noted or contradicted by context, is to be construed as a nonempty collection comprising one or more members. Further, unless otherwise noted or contradicted by context, term "subset" of a corresponding set does not necessarily denote a proper subset of corresponding set, but subset and corresponding set may be equal.

Conjunctive language, such as phrases of form "at least one of A, B, and C," or "at least one of A, B and C," unless specifically stated otherwise or otherwise clearly contradicted by context, is otherwise understood with context as used in general to present that an item, term, etc., may be either A or B or C, or any nonempty subset of set of A and B and C. For instance, in illustrative example of a set having three members, conjunctive phrases "at least one of A, B, and C" and "at least one of A, B and C" refer to any of following sets: {A}, {B}, {C}, {A, B}, {A, C}, {B, C}, {A, B, C}. Thus, such conjunctive language is not generally intended to imply that certain embodiments require at least one of A, at least one of B and at least one of C each to be present. In addition, unless otherwise noted or contradicted by context, term "plurality" indicates a state of being plural (e.g., "a plurality of items" indicates multiple items). In at least one embodiment, number of items in a plurality is at least two, but can be more when so indicated either explicitly or by context. Further, unless stated otherwise or otherwise clear from context, phrase "based on" means "based at least in part on" and not "based solely on."

Operations of processes described herein can be performed in any suitable order unless otherwise indicated herein or otherwise clearly contradicted by context. In at least one embodiment, a process such as those processes described herein (or variations and/or combinations thereof) is performed under control of one or more computer systems configured with executable instructions and is implemented as code (e.g., executable instructions, one or more computer programs or one or more applications) executing collectively on one or more processors, by hardware or combinations thereof. In at least one embodiment, code is stored on a computer-readable storage medium, for example, in form of a computer program comprising a plurality of instructions executable by one or more processors. In at least one embodiment, a computer-readable storage medium is a non-transitory computer-readable storage medium that excludes transitory signals (e.g., a propagating transient electric or electromagnetic transmission) but includes non-transitory data storage circuitry (e.g., buffers, cache, and queues) within transceivers of transitory signals. In at least one embodiment, code (e.g., executable code or source code) is stored on a set of one or more non-transitory computer-readable storage media having stored thereon executable instructions (or other memory to store executable instructions) that, when executed (i.e., as a result of being executed) by one or more processors of a computer system, cause computer system to perform operations described herein. In at least one embodiment, set of non-transitory computer-readable storage media comprises multiple non-transitory computer-readable storage media and one or more of individual non-transitory storage media of multiple non-transitory computer-readable storage media lack all of code while multiple non-transitory computer-readable storage media collectively store all of code. In at least one embodiment, executable instructions are executed such that different instructions are executed by different processors—for example, a non-transitory computer-readable storage medium store instructions and a main central processing unit ("CPU") executes some of instructions while a graphics processing unit ("GPU") executes other instructions. In at least one embodiment, different components of a computer system have separate processors and different processors execute different subsets of instructions.

Accordingly, in at least one embodiment, computer systems are configured to implement one or more services that singularly or collectively perform operations of processes described herein and such computer systems are configured with applicable hardware and/or software that enable performance of operations. Further, a computer system that implements at least one embodiment of present disclosure is a single device and, in another embodiment, is a distributed computer system comprising multiple devices that operate differently such that distributed computer system performs operations described herein and such that a single device does not perform all operations.

Use of any and all examples, or exemplary language (e.g., "such as") provided herein, is intended merely to better illuminate embodiments of disclosure and does not pose a limitation on scope of disclosure unless otherwise claimed. No language in specification should be construed as indicating any non-claimed element as essential to practice of disclosure.

All references, including publications, patent applications, and patents, cited herein are hereby incorporated by reference to same extent as if each reference were individually and specifically indicated to be incorporated by reference and were set forth in its entirety herein.

In description and claims, terms "coupled" and "connected," along with their derivatives, may be used. It should be understood that these terms may be not intended as synonyms for each other. Rather, in particular examples, "connected" or "coupled" may be used to indicate that two or more elements are in direct or indirect physical or electrical contact with each other. "Coupled" may also mean that two or more elements are not in direct contact with each other, but yet still co-operate or interact with each other.

Unless specifically stated otherwise, it may be appreciated that throughout specification terms such as "processing," "computing," "calculating," "determining," or like, refer to action and/or processes of a computer or computing system, or similar electronic computing device, that manipulate and/or transform data represented as physical, such as electronic, quantities within computing system's registers and/or memories into other data similarly represented as physical quantities within computing system's memories, registers or other such information storage, transmission or display devices.

In a similar manner, term "processor" may refer to any device or portion of a device that processes electronic data from registers and/or memory and transform that electronic data into other electronic data that may be stored in registers and/or memory. As non-limiting examples, "processor" may be a CPU or a GPU. A "computing platform" may comprise one or more processors. As used herein, "software" processes may include, for example, software and/or hardware entities that perform work over time, such as tasks, threads, and intelligent agents. Also, each process may refer to multiple processes, for carrying out instructions in sequence or in parallel, continuously or intermittently. In at least one embodiment, terms "system" and "method" are used herein interchangeably insofar as system may embody one or more methods and methods may be considered a system.

In present document, references may be made to obtaining, acquiring, receiving, or inputting analog or digital data into a subsystem, computer system, or computer-implemented machine. In at least one embodiment, process of obtaining, acquiring, receiving, or inputting analog and digital data can be accomplished in a variety of ways such as by receiving data as a parameter of a function call or a call to an application programming interface. In at least one embodiment, processes of obtaining, acquiring, receiving, or inputting analog or digital data can be accomplished by transferring data via a serial or parallel interface. In at least one embodiment, processes of obtaining, acquiring, receiving, or inputting analog or digital data can be accomplished by transferring data via a computer network from providing entity to acquiring entity. In at least one embodiment, references may also be made to providing, outputting, transmitting, sending, or presenting analog or digital data. In various examples, processes of providing, outputting, transmitting, sending, or presenting analog or digital data can be accomplished by transferring data as an input or output parameter of a function call, a parameter of an application programming interface or interprocess communication mechanism.

Although descriptions herein set forth example implementations of described techniques, other architectures may be used to implement described functionality, and are intended to be within scope of this disclosure. Furthermore, although specific distributions of responsibilities may be defined above for purposes of description, various functions and responsibilities might be distributed and divided in different ways, depending on circumstances.

Furthermore, although subject matter has been described in language specific to structural features and/or methodological acts, it is to be understood that subject matter claimed in appended claims is not necessarily limited to specific features or acts described. Rather, specific features and acts are disclosed as exemplary forms of implementing the claims.

What is claimed is:

1. A method comprising:

determining, by a processing circuit, a branch identifier associated with an instruction of an application being executed by an execution thread;

identifying a call stack identifier of the execution thread executing the instruction; and updating the call stack identifier of the execution thread with a new value of the call stack identifier of the execution thread, the updating comprising:

identifying, based on the identified call stack identifier of the execution thread and the branch identifier, a record of a state transition data structure associated with the application, wherein the record comprises the new value of the call stack identifier of the execution thread;

obtaining the new value of the call stack identifier of the execution thread from the identified record; and setting the call stack identifier of the execution thread to the obtained new value of the call stack identifier of the execution thread.

2. The method of claim 1, wherein the new value of the call stack identifier is a numeral representation of a call stack after the execution of the instruction by the execution thread.

3. The method of claim 1, wherein the call stack identifier of the execution thread is a numerical representation of a call stack.

4. The method of claim 1, wherein the branch identifier is a numerical representation of a branch between functions.

5. The method of claim 1, wherein updating the call stack identifier of the execution thread to the new value of the call stack identifier comprises determining whether a type of the instruction is a branch type instruction.

6. The method of claim 1, wherein updating the call stack identifier of the execution thread further comprises:

identifying, based on the identified call stack identifier of the execution thread, the branch identifier and a branch taken value, the record of the state transition data structure associated with the application, wherein the branch taken value is a boolean value indicating whether a branch is taken or not.

7. The method of claim 1, wherein updating the call stack identifier of the execution thread is performed responsive to determining that an update call stack flag associated with the instruction being executed by the execution thread is equal to a first predefined value.

8. The method of claim 1, wherein the call stack identifier of the execution thread is stored in a hardware register associated with the execution thread.

9. The method of claim 1, further comprising:

outputting, via a program counter (PC) sampler, the call stack identifier of the execution thread.

10. The method of claim 1, further comprising:

in response to updating the call stack identifier, updating a register of a performance monitor of the processing circuit in view of a bit flag associated with the register.

11. The method of claim 1, further comprising:

configuring the call stack identifier to be written into at least one of: a data register or memory.

12. A system comprising:

a memory device; and a processing circuit coupled to the memory device, wherein the processing circuit is to perform operations comprising:

determining a branch identifier associated with an instruction of an application being executed by an execution thread;

identifying a call stack identifier of the execution thread executing the instruction; and updating the call stack identifier of the execution thread with a new value of the call stack identifier of the execution thread, the updating comprising:

identifying, based on the identified call stack identifier of the execution thread and the branch identifier, a record of a state transition data structure associated with the application, wherein the record comprises the new value of the call stack identifier of the execution thread;

obtaining the new value of the call stack identifier of the execution thread from the identified record; and setting the call stack identifier of the execution thread to the obtained new value of the call stack identifier of the execution thread.

13. The system of claim 12, wherein the new value of the call stack identifier is a numeral representation of a call stack after the execution of the instruction by the execution thread.

14. The system of claim 12, wherein the call stack identifier of the execution thread is a numerical representation of a call stack.

15. The system of claim 12, wherein the branch identifier is a numerical representation of a branch between functions.

16. The system of claim 12, wherein updating the call stack identifier of the execution thread to the new value of the call stack identifier comprises determining whether a type of the instruction is a branch type instruction.

17. The system of claim 12, wherein updating the call stack identifier of the execution thread further comprises:

identifying, based on the identified call stack identifier of the execution thread, the branch identifier and a branch taken value, the record of the state transition data structure associated with the application, wherein the branch taken value is a boolean value indicating whether a branch is taken or not.

18. The system of claim 12, wherein updating the call stack identifier of the execution thread is performed responsive to determining that an update call stack flag associated with the instruction being executed by the execution thread is equal to a first predefined value.

19. The system of claim 12, wherein the call stack identifier of the execution thread is stored in a hardware register associated with the execution thread.

20. A non-transitory computer-readable medium comprising instructions that, responsive to execution by a processing circuit, cause the processing circuit to perform operations comprising:

receiving a state transition data structure associated with an application to be executed;

encoding a plurality of instructions associated with the application with a branch identifier; and responsive to execution of an instruction of the plurality of instructions by an execution thread, updating a call stack identifier of the execution thread with a new value of the call stack identifier of the execution thread, the updating comprising:

identifying, based on the call stack identifier of the execution thread and the branch identifier, a record of the state transition data structure, wherein the record comprises the new value of the call stack identifier of the execution thread;

obtaining the new value of the call stack identifier of the execution thread from the identified record; and setting the call stack identifier of the execution thread to the obtained new value of the call stack identifier of the execution thread.

21. The non-transitory computer-readable medium of claim 20, wherein the new value of the call stack identifier is a numerical representation of a call stack after the execution of the instruction by the execution thread.

\* \* \* \* \*